United States Patent [19]

Boom

[11] Patent Number: 4,785,020

[45] Date of Patent: Nov. 15, 1988

[54] METHOD FOR PREPARATION OF ANION EXCHANGE RESINS HAVING VERY LOW CHLORINE CONTENT

[75] Inventor: W. Steven Boom, Dayton, Ohio

[73] Assignee: The Dow Chemical Company, Midland, Mich.

[21] Appl. No.: 2,591

[22] Filed: Jan. 12, 1987

[51] Int. Cl.$^4$ .............................................. B01J 41/14
[52] U.S. Cl. .................................................... 521/32
[58] Field of Search ........................................ 521/32

[56] References Cited

U.S. PATENT DOCUMENTS

| | | |
|---|---|---|
| 3,817,878 | 6/1974 | Clemens et al. ...................... 521/32 |
| 4,177,140 | 12/1979 | Smakman .............................. 521/32 |
| 4,321,331 | 3/1982 | Widiger, Jr. et al. ................ 521/32 |
| 4,513,121 | 4/1985 | Hansson et al. .................. 525/332.3 |

*Primary Examiner*—Joseph L. Schofer
*Assistant Examiner*—Peter F. Kulkosky

[57] ABSTRACT

A method of preparing low chloride strong-base anion exchange resin is disclosed. The method involves a two-step amination of the haloalkylated copolymer beads at temperatures below 60° C.

17 Claims, No Drawings

METHOD FOR PREPARATION OF ANION EXCHANGE RESINS HAVING VERY LOW CHLORINE CONTENT

BACKGROUND OF THE INVENTION

This invention relates to ion exchange resins, and in particular to anion exchange resins having a low chlorine content.

Anion exchange resins are employed in numerous water treatment applications in order to purify streams which are in contact with metals, especially ferrous metals. Unfortunately, such resins contain chlorine in the form of chloride ions and organic chloride which can leach into the treated fluid to cause corrosion of said metals.

Strong anion exchange resins in the normal chloride form that have been treated to convert them to the hydroxide form will tend to show an increase in active ionic chloride immediately after conversion and subsequently during storage. The active ionic chloride used herein is the chloride in ionic form which is leachable from the resin, as distinguished from covalent chlorine which is strongly bound and releasable usually only upon destruction of the resin.

It is thought the source of the increased active chloride is unreacted chlorine sites in the polymer network resulting from incomplete functionalization of the resin or chlorine introduced to the inert copolymer matrix which thereafter converts from covalent to ionic form upon conversion of the resin to the hydroxide form. It is further believed that the functional group of the ion exchange resin in hydroxide form is capable of causing migration of chlorine within the molecule.

Chloride ion can be displaced from a resin by treating the resin with (1) solutions containing ions for which the resin has a selectivity in preference approaching, equaling or exceeding chloride; (2) highly concentrated solutions containing ions for which the resin has low to high selectivity; and (3) fluids containing complexes for which the resin has high affinity. Additionally, resins having high chloride content can lose chloride to relatively pure solvents or solvent mixtures under conditions of high temperature, pressure, and the like.

Unfortunately, conversion of the normal chloride form of an anion exchange resin to the hydroxide form by the prior art methods has not achieved the goal of completely removing "active" chloride ions. Typical low chloride content anion exchange resins contain about 2 to about 10 equivalent percent chloride, based on total exchangeable ions. Such resins are clearly limited in the amount of their functional capacity in the hydroxide form.

More recently, as described in U.S. Pat. No. 4,025,467, there is disclosed a process for preparing strong-base anion exchange resins containing less than 0.5 percent active chloride. Such a process involves the solvolytic displacement of non-ionic chloride ions. Such a process involves treating the resin in an aqueous medium under harshly basic conditions and relatively high temperatures. Such harsh treatments are undesirable because they are time-consuming, uneconomical, and provide ion exchange resins which are more susceptible to breakage and have lower exchange capacity than is desirable.

In view of the deficiencies of the prior art, it would be highly desirable to provide a process for preparing an ion exchange resin having a very low chloride content, which resin can be prepared in the absence of undesirable harsh conditions.

SUMMARY OF THE INVENTION

In one aspect, the present invention is a process for preparing strong-base anion exchange resins containing less than 0.5 equivalent percent total chloride based on active sites of the resin, said process comprising providing crosslinked polymer beads which are haloalkylated, functionalizing the haloalkylated crosslinked polymer beads with a tertiary amine, and further functionalizing said functionalized crosslinked polymer beads with a primary or secondary amine of a low molecular weight, and contacting the functionalized crosslinked polymer beads at a temperature less than about 60° C. with an effective amount of at least one ionic agent exchangeable with chloride ions.

In another aspect, the present invention is an anion exchange resin essentially free of active chloride. For example, said anion exchange resin can be produced in accordance with the process of this invention.

The resins of this invention are useful in numerous water treatment applications where purified streams of water are desirable. The resins have low levels of both organic and inorganic chloride.

DETAILED DESCRIPTION OF THE INVENTION

The monomers useful in the preparation of the copolymer particles are advantageously suspension polymerizable ethylenically unsaturated monomers. Such suspension polymerizable monomers are well known in the art and reference is made to *Polymer Processes*, edited by Calvin E. Schildknecht, published in 1956 by Interscience Publishers, Inc., New York, Chapter III, "Polymerization in Suspension" by E. Trommsdoff and C. E. Schildknecht, pp. 69–109 for purposes of illustration. In Table II on pp. 78–81 of Schildknecht are listed diverse kinds of monomers which can be employed in the practice of this invention. Suitable monoethylenically unsaturated monomers and polyethylenically unsaturated monomers useful in the practice of this invention are also disclosed in U.S. Pat. No. 4,419,245; which is incorporated herein by reference. Of such suspension polymerizable monomers, of particular interest herein are the water-insoluble monomers including the monovinylidene aromatics such as styrene, vinyl naphthalene, alkyl substituted styrenes (particularly monoalkyl substituted styrenes such as vinyltoluene and ethyl vinylbenzene) the polyvinylidene aromatics such as divinylbenzene, divinyltoluene, divinylxylene, divinylnaphthalene, trivinylbenzene, divinyl diphenyl ether, and the like; esters of α, β-ethylenically unsaturated carboxylic acids, particularly acrylic or methacrylic acid, such as methyl methacrylate, ethyl acrylate, diverse alkylene diacrylates and alkylene dimethacrylates, and mixtures of one or more of said monomers. Of said monomers, the monovinylidene aromatics, particularly styrene or a mixture of styrene with a monoalkyl substituted styrene; the polyvinylidene aromatics, particularly divinylbenzene; esters of α,β-ethylenically unsaturated carboxylic acids, particularly methyl methacrylate or mixtures containing methyl methacrylate, particularly a mixture of styrene and divinylbenzene or styrene, divinylbenzene and methyl methacrylate are preferably employed herein.

Preferably, the initiator useful herein is a conventional chemical initiator useful as a free-radical generator in the polymerization of ethylenically unsaturated monomers. Representative of such initiators are chemical initiators including azo compounds such as azobisisobutyronitrile; peroxygen compounds such as benzoyl peroxide, t-butyl peroctoate, t-butyl perbenzoate and isopropylpercarbonate; and the like. Several catalysts are disclosed in U.S. Pat. Nos. 4,192,921; 4,246,386; and 4,283,499. The initiator is employed in an amount sufficient to cause the copolymerization of the monomeric components in the monomer mixture. Such amount will generally vary depending on a variety of factors including the type of initiator employed, and the type and proportion of monomers in the monomer mixture used herein. Generally, the initiator is employed in amounts from about 0.02 to about 1, preferably from about 0.05 to about 0.5, weight percent based on the total weight of the monomer mixture.

The monomers are advantageously suspended, with agitation, in a suitable suspending medium such as water or other aqueous liquid. Suspending agents useful herein are those materials which assist in maintaining a dispersion of the droplets in the aqueous liquid. In general, suspending agents conventionally employed hereto in the suspension polymerization of mono- and polyethylenically unsaturated monomers are advantageously employed. Representative of such suspending agents are gelatin, polyvinyl alcohol, magnesium silicate, hydroxyethylcellulose, methylcellulose, carboxymethyl methylcellulose, and the like. Other suitable suspending agents are disclosed in U.S. Pat. No. 4,419,245.

While the amount of the suspending medium (i.e., aqueous phase) advantageously employed herein, will vary depending on the type and amount of the suspending agent, the amount of monomer, in general, the suspending medium is employed in amounts from about 30 to about 70, preferably from about 40 to about 60, weight percent based on the weight of the monomer/suspending medium mixture.

The copolymer beads of this invention are advantageously prepared by forming a crosslinked, free-radical-containing matrix (hereinafter "free-radical matrix"), and contacting said free-radical matrix with a monomer feed comprising at least one monomer under conditions such that free radicals catalyze the polymerization of said monomer to form polymer beads. Said polymerization is carried out as a suspension polymerization wherein the polymeric matrix and the monomers to be polymerized are suspended in a suitable suspending medium which is generally an aqueous solution containing a suspension stabilizer.

The prepared free-radical matrix is suspended in an appropriate suspending medium. In general, said suspending medium is a liquid in which both the free-radical matrix and the monomers to be contacted therewith are insoluble. Said suspending medium is typically an aqueous solution containing from about 0.1 to about 1.5 weight percent of a suspension stabilizer. In addition, the suspension can suitably contain polymerization inhibitors, dispersants, and other materials known to be advantageously employed in the suspension polymerization of ethylenically unsaturated monomers.

Phase separating organic liquids which are useful herein are preferably solvents for the monomer, but are not solvents for the copolymer. The phase separating organic liquid is inert in that it does not react with the monomers (for which it is a solvent), the copolymers (for which it is not a solvent), or the suspending medium. Generally, organic liquids having boiling points greater than about 60° C. are employed. Suitable phase separating organic liquids include aromatic hydrocarbons and aliphatic hydrocarbons. Examples include iso-octane, hexane, benzene, toluene, xylene, and the like, as well as those non-halogenated "non-solvents" disclosed in U.S. Pat. No. 3,716,482. The amount of phase separating organic liquid which is employed can vary and can range from about 10 to about 60 percent, based on the weight of the organic liquid and monomer employed in the initial suspension mixture.

The suspension is contacted with a monomer feed comprising at least one ethylenically unsaturated monomer (and preferably a crosslinking monomer) under conditions such that the free radicals contained in the free-radical matrix catalyze the polymerization of said monomer feed. Such techniques are taught in U.S. Pat. Nos. 4,419,245 and 4,564,644; both of which are incorporated herein by reference. Most preferably, it is desirable to prepare copolymer particles using the techniques taught in the aforementioned U.S. Pat. No. 4,564,644. The monomer feed is preferably continuously added to the suspension. Generally, the amount of monomer feed which is employed in the monomer feed can vary but is generally less than about 80 percent, based on the weight of the total amount of monomer which is employed. The monomer feed is added over a period of time which can vary, but is preferably from about 1 to about 10 hours.

The polymerization conditions are continued until polymerization of monomer is essentially complete. The reaction can be finished by raising the temperature of the reaction mixture. If the copolymer beads are macroporous in character, they are subjected to conditions such that the organic phase separating liquid is removed from the beads. This can be accomplished using a process such as distillation. The copolymer beads can be separated using conventional techniques.

The size of the copolymer particles or beads of this invention can vary and is advantageously in the range from about 50 to 2000 microns ($\mu$), preferably from about 200 to 1200 $\mu$. Control of the size of the beads can be achieved by controlling the agitation rate, suspending agent, and the amount of monomers employed, or by the initial size of the free-radical matrix and the amount of monomer feed.

Polymer beads of this invention can be prepared using batch or suspension polymerization techniques disclosed in U.S. Pat. No. 4,444,961, which is incorporated herein by reference.

The copolymer particles or beads are converted to anion beads using techniques well known in the art for converting crosslinked addition polymers of a mono- and polyethylenically unsaturated monomer to such resins. In the preparation of strong- and weak-base resins from copolymer beads such as crosslinked polystyrene beads, the beads are advantageously haloalkylated, preferably halomethylated, most preferably chloromethylated, and the ion active exchange groups subsequently attached to the haloalkylated copolymer. Methods for haloalkylating the crosslinked addition copolymers and the haloalkylating agents included in such methods are also well known in the art. Reference is made thereto for the purposes of this invention. Illustrative of such are U.S. Pat. Nos. 2,642,417; 2,960,480; 2,597,492; 2,597,493; 3,311,602; 2,616,817 and 4,025,467 and *Ion Exchange* by F. Helfferich, published in 1962 by McGraw-Hill Book Company, N.Y.; all of which are hereby incorporated by reference. Typically, the haloalkylation reaction consists of swelling the crosslinked addition copolymer with a haloalkylating agent, preferably bromomethylmethyl ether, chloromethylmethyl ether or a mixture of formaldehyde and hydrochloric acid, most preferably chloromethylmethyl ether and then reacting the copolymer and haloalkylating agent in the presence of a Friedel-Crafts catalyst such as zinc chloride, iron chloride or aluminum chloride. Such haloalkylated copolymers provide basis for active sites in the resin.

Generally, ion exchange beads are prepared from the haloalkylated bead by contacting said bead with a compound capable of displacing the halogen of the haloalkyl group and which, upon reaction, forms an active ion exchange group. That is, the crosslinked polymer beads are functionalized. Such compounds and methods for preparing ion exchange resins therefrom are well known in the art and U.S. Pat. Nos. 2,632,000; 2,616,877; 2,642,417; 2,632,001; 2,992,544 (all of which are hereby incorporated by reference) and F. Helfferich supra are illustrative thereof. Strong-base ion exchange resins are prepared using tertiary amines such as trimethyl amine, triethyl amine, tributyl amine, dimethylisopropanol amine, ethylmethylpropyl amine, dimethylamino ethanol, or the like as aminating agents.

Amination with tertiary amines generally comprises heating a mixture of the haloalkylated polymer beads and at least a stoichiometric amount of the aminating agent, (i.e., the amine) to a temperature sufficient to displace the halogen atom attached to the carbon atom and to the aromatic nucleus of the polymer with aminating agent. This reaction is preferably carried out by adding the amine to the haloalkylated polymer beads as they are swollen, suspended and agitated in a liquid which is a solvent for the amine. A reaction medium such as water, ethanol, methanol, methylene chloride, ethylene dichloride, dimethoxymethylene, or combinations thereof are suitable. Preferably, water is the suspending medium employed. The mixture may be allowed to react at room temperature, or preferably at elevated temperatures after which the resin containing quaternary ammonium salt groups is freed of the liquid. The amination is carried out when the copolymer bead is in a swollen state such that anion exchange sites are uniformly dispersed throughout the entire bead.

The strong-base anion exchange resin can be further aminated by contacting the aminated bead with a primary or secondary amine of a smaller molecular size under conditions which result in the amination of the haloalkylated sites which are not aminated by the larger tertiary amine molecules.

Suitable amines for the second amination step include dimethylamine, methylamine, and ethyleneamine, and other similar low molecular weight amines such as methyl ethyl amine. Suitable amines are preferably of a molecular weight less than about 50. Most preferred of the amines is the primary methyl amine. The amount of primary or secondary amine used can range from about 0.8 mole amine/mole of resin to about 4.0 mole amine/mole of resin. Preferably, the amine is employed in a range from about 1.5 mole amine/mole of resin to about 4 mole amine/mole of resin. The operative ranges of reaction will vary according to the temperature and pressure conditions which a particular resin can tolerate. The reaction may be carried out at temperatures ranging from about 20° C. to about 70° C., preferably between about 25° C. and 50° C. The pressure may range from about 5 to about 10 psig. Suitable methods of amination are well known in the art and the U.S. patent numbers cited earlier regarding methods for preparing ion exchange resins from such haloalkylated beads are illustrative of such methods.

Low chloride resins in the hydroxide form are prepared by converting the functionalized haloalkylated copolymer particles to the hydroxide form by using a process which most desirably comprises two sequential steps. Two steps are desirably required due to the difference in selectivity between the chloride ion and the hydroxide. The selectivity of the excess strong-base group for any particular anion depends somewhat on the particular strong-base group employed, the resin, matrix and like factors. However, Wheaton and Bauman in *Industrial Engineering Chemistry*, Vol. 43, page 1088 (1951), identify the following selectivity sequence of general purpose anion exchange resins: salicylate>iodide>phenate>bisulfate>nitrite>bromide->cyanide>bisulfite>nitrate>chloride>bicarbonate>dihydrogen phosphate>formate>acetate>aminoacetate>hydroxide>fluoride. In addition, ion exchange resins in general tend to prefer the counterion having the highest valence, that having the smallest hydrated equivalent volume, that with the greater polarizability, that which interacts more strongly with the fixed ionic groups or with the matrix and that which participates least in complex formation with the coanion. Most preferably, the first step of the sequence involves the contacting of the resin with a solution of carbonate, bicarbonate, or mixture thereof. The second step requires the contacting of the resin with a solution of hydroxide. Alternatively, use of a one-step process only using hydroxide can be employed.

The amount of carbonate, bicarbonate or mixture thereof typically ranges from about 20 to about 50, preferably 30 to 40 bed volumes per bed volume of resin. The amount of carbonate can range from about 0 to about 100, preferably about 70 to about 85; and the amount of bicarbonate can range from about 0 to about 100, preferably about 15 to about 30 equivalent percent. Most desirably, the carbonate, bicarbonate or mixture thereof is employed in an aqueous form as a solution in water. Typically, such a mixture is employed as about a 5 to about a 10 weight percent amount in water. The amount of carbonate which is employed can range from greater than 0 to about 30 weight percent in water, while the amount of bicarbonate can range from greater than 0 to about 13 weight percent in water.

The amount of hydroxide which is employed preferably ranges from about 50 to about 70 bed volumes per bed volume of resin when the one-step process of treatment with hydroxide is employed. When the preferable two-step treatment with carbonate and/or bicarbonate is employed, about 5 to about 10 bed volumes hydroxide per bed volume of resin can be suitably employed. The amount of hydroxide is employed as an aqueous solution which can vary but preferably as a 10 to 20 percent solution in water.

The temperature at which the process is performed can vary below about 60° C., more preferably below 50° C., most preferably about room temperature.

The agents or solutions which are effective to convert the resin to the hydroxide form at flow rates can vary from about 3 to about 5 gal./min./sq. ft., through a 1-inch column.

The process of this invention provides anion exchange resins which comprise greater than about 95 equivalent percent quaternary ammonium exchange groups, based on total exchangeable sites. The resins also contain less than about 100 ppm of organic chloride, and more preferably less than 80 ppm of organic chloride.

It is believed that the active ionic chloride level in the hydroxide form resin is directly related to the level of organic chlorine in the chloride form resin from which it is made. As noted earlier, the unreacted organic chlorine may convert to the ionic form upon conversion of the resin to the hydroxide form.

The following example is intended to illustrate the invention and is not intended to limit the scope thereof in any way. All parts and percentages are by weight based on the weight of the organic and water phases unless otherwise noted.

EXAMPLE 1

Into a jacketed pressure reactor controlled by a temperature controller are added in a series of runs, various preselected amounts of a 40 percent methyl amine solution in water as well as 200 ml of a strong-base anion exchange resin sold commercially as DOWEX ® I by The Dow Chemical Company. In each run, the reactor is sealed and heated to 50° C. at 5 to 10 psig. After 24 hours, the contents are acidified with hydrochloric acid and then washed with deionized water. The washing is done in a glass column with a fitted disk. The water is passed through the fitted disk at the bottom, flowed through the resin and then exited. This washing is done until the pH of the effluent is neutral. The resin is completely converted to its nitrate form using 250 ml of a 0.5N sodium nitrate solution at a flow rate of 4 to 5 ml per minute. A preweighed sample is then activated with radiation and the organic chlorides which remain are counted using neutron activation analysis. Data for the samples are presented in Table I.

TABLE I

| Sample | Resin (ml) | Aqueous Methyl Amine (ml) | $H_2O$ (ml) | Reaction Time (hr) | Organic Chloride (ppm) | Estimated Ionic Chloride Percent Equivalents |
|---|---|---|---|---|---|---|
| C-1* | 200 | — | — | — | 3,000 | ~3.66 |
| 1 | 200 | 250 | 0 | 22 | 58 | ~0.07 |
| 2 | 200 | 45 | 100 | 24 | 75 | ~0.09 |
| 3 | 200 | 90 | 60 | 24 | 48 | ~0.06 |
| 4 | 200 | 90 | 60(1) | 24 | 44 | ~0.05 |

(1)Sample includes 48 ml $H_2O$, 12 ml of a 50 percent NaOH solution.
*Not an example of this invention, DOWEX ® I resin which has not been functionalized with the primary or secondary amine.

The data illustrates the low amounts of organic chloride present in the treated resin compared to conventional resins which have not been subjected to a second amination.

What is claimed is:

1. A process for preparing a strong-base anion exchange resin containing less than about 0.5 equivalent percent of active ionic chloride based on active sites of the resin, which comprises providing crosslinked polymer beads of a vinyl acrylic or vinyl aromatic monomer which have been haloalkylated; functionalizing the haloalkylated polymer beads with a tertiary amine containing no substantial amount of primary or secondary amine; further functionalizing the functionalized crosslinked polymer bead with a primary or secondary amine of a low molecular weight; and contacting the functionalized crosslinked polymer bead with at least one ionic agent exchangeable with chloride ions.

2. The process of claim 1 wherein the crosslinked copolymer beads are chloromethylated.

3. The process of claim 1 wherein the primary or secondary amine exhibits a molecular weight less than about 50.

4. The process of claim 3 wherein the primary or secondary amine is selected from the group consisting of dimethylamine, methylamine or ethylene amine.

5. The process of claim 1 wherein the functionalization with primary or secondary amine is carried out at a temperature between about 50° C. to 25° C.

6. The process of claim 4 wherein the primary or secondary amine is used in an amount ranging from about 0.8 mole amine/mole resin to about 4.0 mole amine/mole resin.

7. The process of claim 4 wherein the primary or secondary amine is used in an amount ranging from about 1.5 mole amine/mole resin to about 4.0 mole amine/mole resin.

8. The method of claim 2 wherein the tertiary amine is selected from the group consisting of trimethylamine, triethylamine, tributylamine, dimethylisopropanol amine, ethylmethylpropyl amine and dimethylamino ethanol.

9. The process of claim 1 wherein the exchange of the ionic agent with the chloride ions comprises contacting the resin with carbonate, bicarbonate or a mixture thereof and then contacting the resin with a hydroxide solution.

10. The process of claim 1 wherein the exchange of the ionic agent with the chloride ions comprises contacting the resin with a hydroxide solution.

11. The process of claim 9 or 10 wherein the functionalized polymer bead and ionic agent exchangeable with chloride ions are contacted at a temperature less than about 60° C.

12. The process of claim 9 or wherein the functionalized polymer bead and ionic agent exchangeable with chloride ions are contacted at a temperature less than about 50° C.

13. The process of claim 1 wherein the strong-base anion exchange resin provided contains less than about 100 ppm of organic covalent chlorine.

14. The process of claim 13 wherein the amount of organic covalent chlorine is less than about 80 ppm.

15. A strong-base anion exchange resin containing less than 0.5 equivalents of active ionic chloride based on active sites of the resin prepared by the process of claim 1.

16. A strong-base anion exchange resin containing low amounts of organic covalent chlorine prepared by the process of claim 14.

17. The process of claim 1 wherein the functionalization of the functionalized crosslinked copolymer bead is carried out at a pressure ranging from about 5 to about 10 psig.

* * * * *

UNITED STATES PATENT AND TRADEMARK OFFICE
CERTIFICATE OF CORRECTION

PATENT NO. : 4,785,020

DATED : November 15, 1988

INVENTOR(S) : W. Steven Boom

It is certified that error appears in the above-identified patent and that said Letters Patent is hereby corrected as shown below:

Claim 12, column 8, line 45, "9 or" should read --9 or 10--

Signed and Sealed this

Third Day of April, 1990

Attest:

HARRY F. MANBECK, JR.

Attesting Officer

Commissioner of Patents and Trademarks